(12) United States Patent
Patel et al.

(10) Patent No.: US 12,449,041 B2
(45) Date of Patent: *Oct. 21, 2025

(54) VALVE SEAT ASSEMBLY

(71) Applicant: GD Energy Products, LLC, Tulsa, OK (US)

(72) Inventors: Pankaj Harmanbhai Patel, Fort Worth, TX (US); Jason Lee Mayo, West Odessa, TX (US); Gregory Vincent Protz, Midland, TX (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/751,402

(22) Filed: Jun. 24, 2024

(65) Prior Publication Data

US 2024/0369141 A1 Nov. 7, 2024

Related U.S. Application Data

(63) Continuation of application No. 18/164,343, filed on Feb. 3, 2023, now Pat. No. 12,018,759.

(60) Provisional application No. 63/662,648, filed on Jun. 21, 2024, provisional application No. 63/662,642, filed on Jun. 21, 2024.

(51) Int. Cl.
  *F16K 1/42* (2006.01)
  *F16K 25/00* (2006.01)

(52) U.S. Cl.
  CPC .............. *F16K 1/42* (2013.01); *F16K 25/005* (2013.01)

(58) Field of Classification Search
  CPC ........ F16K 1/42; F16K 25/005; F16K 15/063; F04B 1/0461; F04B 53/1025; F04B 53/1027; F04B 53/1087; F04B 53/1022
  See application file for complete search history.

(56) References Cited

U.S. PATENT DOCUMENTS

| | | | |
|---|---|---|---|
| 3,186,430 A * | 6/1965 | Koutnik | F16K 15/063 251/364 |
| 4,951,920 A | 8/1990 | Tsuno | |
| 6,910,871 B1 | 6/2005 | Blume | |
| 7,070,166 B1 | 7/2006 | Blume | |
| 7,186,097 B1 | 3/2007 | Blume | |
| 7,513,759 B1 | 4/2009 | Blume | |
| 7,540,470 B1 | 6/2009 | Blume | |

(Continued)

FOREIGN PATENT DOCUMENTS

WO 2019169312 A1 9/2019

OTHER PUBLICATIONS

Notification of Transmittal of International Search Report and Written Opinion including International Search Report and Written Opinion for International Patent Application No. PCT/US2024/012586 mailed Apr. 26, 2024, 15 pages.

(Continued)

*Primary Examiner* — Patrick C Williams
(74) *Attorney, Agent, or Firm* — Edell, Shapiro & Finnan, LLC

(57) ABSTRACT

A valve seat assembly utilized in a fluid end assembly of a reciprocating pump may contain a strike ring and a support sleeve. The support sleeve and the strike ring are disposed in a bore in a fluid end casing with the strike ring engaging the support sleeve. The fluid end assembly includes a fluid end housing with several bores.

19 Claims, 14 Drawing Sheets

(56) References Cited

U.S. PATENT DOCUMENTS

| | | |
|---|---|---|
| 7,726,026 B1 | 6/2010 | Blume |
| 8,147,227 B1 | 4/2012 | Blume |
| 8,261,767 B1 | 9/2012 | Blume |
| 8,784,081 B1 | 7/2014 | Blume |
| 8,915,722 B1 | 12/2014 | Blume |
| 9,416,887 B2 | 8/2016 | Blume |
| 9,435,454 B2 | 9/2016 | Blume |
| 9,822,894 B2 | 11/2017 | Bayyouk et al. |
| 10,344,757 B1 | 7/2019 | Stark et al. |
| 10,633,071 B2 | 4/2020 | Hasegawa |
| 10,753,495 B2 | 8/2020 | Bayyouk et al. |
| 10,851,775 B2 | 12/2020 | Stark et al. |
| 10,854,775 B2 | 12/2020 | Stark et al. |
| 10,954,938 B2 | 3/2021 | Stark et al. |
| 11,078,903 B2 | 8/2021 | Nowell et al. |
| 11,156,221 B2 | 10/2021 | Stark et al. |
| 11,384,756 B1 | 7/2022 | Smith |
| 11,920,684 B1 | 3/2024 | Xu et al. |
| 2002/0079332 A1* | 6/2002 | McIntire ............. F04B 53/1032 222/189.06 |
| 2019/0032792 A1 | 1/2019 | Miller |
| 2019/0040966 A1 | 2/2019 | Myers |
| 2019/0063427 A1 | 2/2019 | Nowell et al. |
| 2019/0101221 A1 | 4/2019 | Hagen |
| 2019/0120389 A1 | 4/2019 | Foster et al. |
| 2019/0136842 A1 | 5/2019 | Nowell et al. |
| 2019/0368619 A1 | 12/2019 | Barnett et al. |
| 2020/0284365 A1 | 9/2020 | Bayyouk et al. |
| 2021/0095650 A1 | 4/2021 | Nowell et al. |
| 2021/0190067 A1 | 6/2021 | Nowell et al. |
| 2021/0190223 A1 | 6/2021 | Bayyouk |

OTHER PUBLICATIONS

Notification of International Search Report and Written Opinion including International Search Report and Written Opinion for International Application No. PCT/US2025/034568 mailed Sep. 3, 2025.

* cited by examiner

VALVE SEAT ASSEMBLY

CROSS-REFERENCE TO RELATED APPLICATIONS

This patent application is a continuation of and claims priority to and the benefit under 35 U.S.C. § 120 of U.S. patent application Ser. No. 18/164,343, entitled "VALVE SEAT ASSEMBLY," filed Feb. 3, 2023, the entire disclosure of which is hereby incorporated by reference in its entirety. This patent application also claims priority to and the benefit of both U.S. Provisional Patent Application No. 63/662,642, entitled "VALVE SEAT ASSEMBLY," filed Jun. 21, 2024, and U.S. Provisional Patent Application No. 63/662,648, entitled "VALVE SEAT ASSEMBLY," filed Jun. 21, 2024. The entire disclosure of each of the two above-identified U.S. provisional applications is also hereby incorporated by reference in its entirety.

FIELD OF THE INVENTION

The present invention relates to the field of high pressure reciprocating pumps and, in particular, to the seals utilized in the fluid ends of high pressure reciprocating pumps.

BACKGROUND OF THE INVENTION

High pressure reciprocating pumps are often used to deliver high pressure fluids during earth drilling operations. One or more sealing arrangements are typically provided in the fluid end of a pump to seal conduits formed in the fluid end and prevent, or at least discourage, leakage. More specifically, the fluid end may define an internal chamber and one or more conduits may define pathways between the internal chamber and one or more external surfaces of the fluid end. At least some segments of these conduits may be sealed with a sealing assembly (e.g., a cover, plug, and/or sleeve) that includes or defines one or more seals. Additionally, or alternatively, some of the segments may include valves or valve components that include or define one or more seals in conjunction with corresponding valve seats. These seals may prevent, or at least discourage, leakage through the conduits.

The high pressures experienced by these reciprocating pumps result in component failures that are not typically seen or experienced with pumps that operate at lower pressures. Typical failures may include erosion or wearing of the valve seat. This may be accelerated due to the forces exerted by and onto the valve seat when a valve strike surface/scaling face is compressed against the valve seat. The higher the pressures experienced by the reciprocating pumps, the faster the valve seats are eroded. When the valve seat fails, leakages occur around the valve, which ultimately reduces the maximum pressure and flow capabilities of the pump.

SUMMARY

The present application relates to techniques for sealing a segment of a fluid end of a high pressure reciprocating pump. The techniques may be embodied as a valve component and/or a sealing assembly that is provided independent of any other elements or that is incorporated in a fluid end as part of a kit, as part of a fluid end, and/or as part of a reciprocating pump.

In one embodiment, the invention relates to a valve seat assembly for a reciprocating pump with the valve seat assembly including a strike ring having a first body, the first body having a first end surface, a second end surface opposite the first end surface, and a first outer surface, and a support sleeve having a second body, the second body having a third end surface, a fourth end surface opposite the third end surface, and a second outer surface, the second outer surface having a different configuration than the first outer surface, and the third end surface of the second body being engaged by the second end surface of the first body, wherein the strike ring is engageable by a valve.

In one embodiment, the strike ring is constructed from a tungsten carbide material. In another embodiment, the first end surface of the strike ring is angled with respect to the first outer surface and forms at least a portion of a strike surface of the strike ring. In yet another embodiment, the first body of the strike ring has a first inner surface that defines a first bore, and the first end surface is a strike surface that is oriented at an angle relative to the first inner surface. Also, the angle is approximately 30 degrees. In addition, the second body of the support sleeve includes a second inner surface defining a second bore, and the second outer surface of the second body includes a first tapered portion and a second tapered portion, the second tapered portion being oriented at a different angle relative to the second bore than the first tapered portion. In another embodiment, the first outer surface of the first body is straight and at least a portion of the second outer surface of the second body is tapered. Also, the second outer surface includes a relief feature formed therein.

In one embodiment, the first body defines a first bore therethrough, the second body defines a second bore therethrough, the first body and the second body are separate from and movable relative to each other, and the first bore is aligned with the second bore when the first body is proximate to the second body. In addition, the first body is insertable into a first portion of a bore in a fluid end casing of a reciprocating pump, and the support sleeve is insertable into a second portion of the bore.

In another embodiment, the invention relates to a valve seat assembly for a fluid end of a reciprocating pump, with the fluid end including a fluid end bore formed therein. The valve seat assembly includes a support sleeve having a first end surface and a second end surface opposite the first end surface, the support sleeve being insertable into the fluid end bore, and a strike ring having a third end surface and a fourth end surface opposite the third end surface, the strike ring being insertable into the fluid end bore and engageable with the support sleeve, wherein the third end surface of the strike ring engages the second end surface of the support sleeve when the support sleeve and the strike ring are inserted into the fluid end bore.

In one embodiment, the strike ring is constructed from a tungsten carbide material. In another embodiment, the strike ring has an inner surface that defines a bore through the strike ring, and the fourth end surface of the strike ring is oriented at an angle with respect to the inner surface of the strike ring. Alternatively, the support sleeve has a first outer surface and the strike ring has a second outer surface, and a portion of the first outer surface has an outer diameter that is the same as a portion of the second outer surface.

In another embodiment, the invention relates to a valve assembly for a fluid end of a reciprocating pump. The valve assembly includes a valve component including a valve body, the valve body having a first strike surface and defining a recess, the valve body including an insert disposed at least in part in the recess, and a valve seat assembly disposable in a bore of the fluid end, the valve seat assembly includes a strike ring and a support sleeve, the strike ring is engageable with the support sleeve when the strike ring and the support sleeve are placed in the bore, the strike ring has a second strike surface, and both of the first strike surface and the insert of the valve component engage the second strike surface of the strike ring when the valve component engages the strike ring.

In one embodiment, the strike ring is constructed from a tungsten carbide material. Alternatively, the strike ring includes a first end surface and a second end surface opposite the first end surface, the support sleeve includes a third end surface and a fourth end surface opposite the third end surface, and the second end surface of the strike ring engages the third end surface of the support sleeve when the strike ring engages the support sleeve. Also, the strike ring defines a bore therethrough, the first end surface of the strike ring is angled with respect to the bore, and the first end surface forms the second strike surface.

In one embodiment, the support sleeve includes an inner surface defining a first bore, and the second outer surface of the support sleeve includes a first tapered portion and a second tapered portion, the second tapered portion being oriented at a different angle relative to the first bore than the first tapered portion. Alternatively, the insert is made from a resilient material and its profile is compressed when the valve component engages the strike ring.

BRIEF DESCRIPTION OF THE DRAWINGS

The apparatuses, systems, devices, modules, valve components, valve seats, seals, and/or sealing elements presented herein may be better understood with reference to the following drawings and description. It should be understood that some elements in the figures may not necessarily be to scale and that emphasis has been placed upon illustrating the principles disclosed herein. In the figures, like-referenced numerals designate corresponding parts throughout the different views.

DETAILED DESCRIPTION

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Also, the terms "comprising," "including," "having," and the like, as used with respect to embodiments of the present disclosure, are synonymous.

Figure 1:
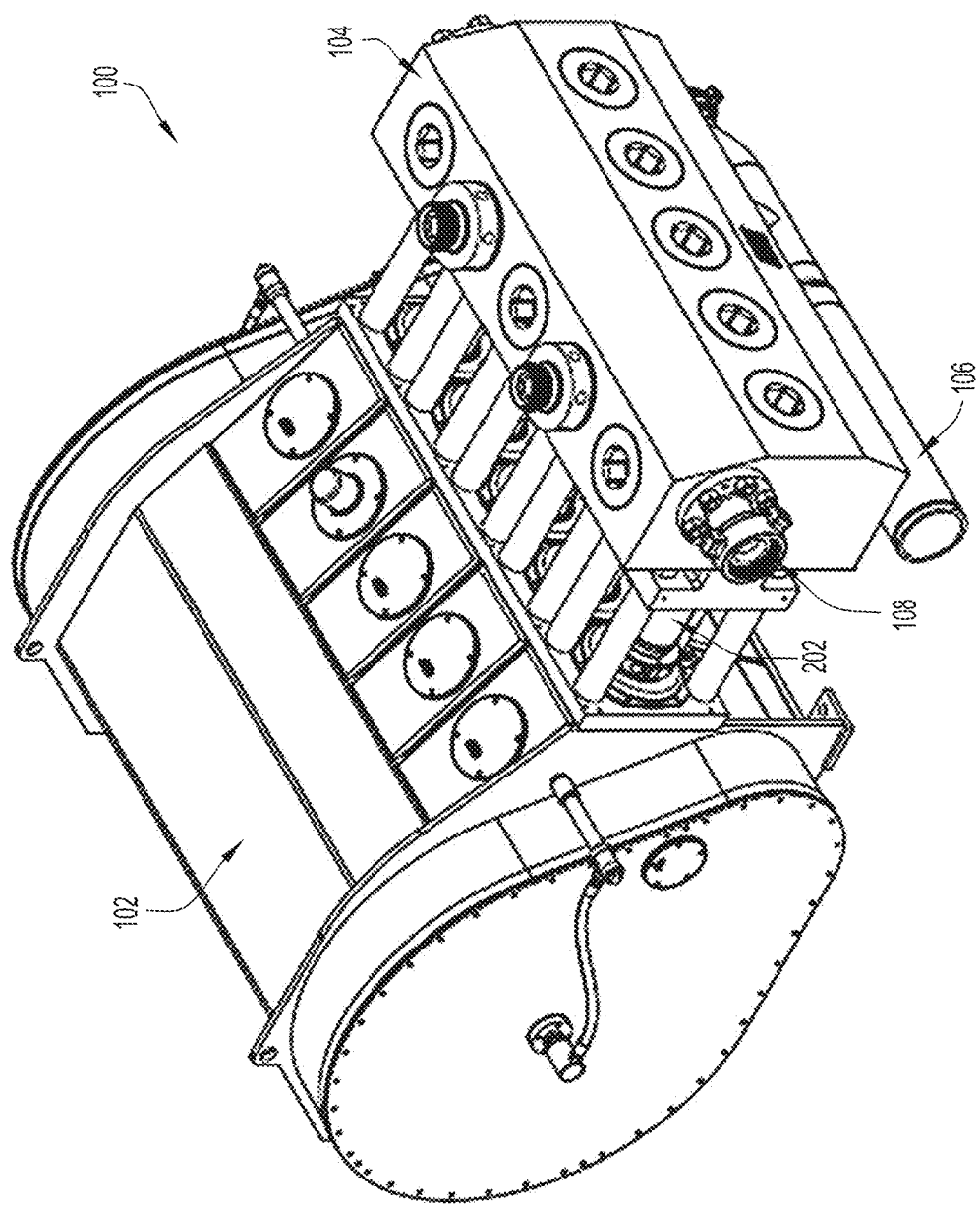
FIG. 1 is a perspective view of a prior art reciprocating pump including a fluid end.

Referring to FIG. 1, a prior art reciprocating pump 100 is illustrated. The reciprocating pump 100 includes a power end 102 and a fluid end 104. The power end 102 includes a crankshaft that drives a plurality of reciprocating plungers within the fluid end 104 to pump fluid at high pressure. Generally, the power end 102 is capable of generating forces sufficient to cause the fluid end 104 to deliver high pressure fluids to earth drilling operations. For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations. However, to be clear, this example is not intended to be limiting and the present application may be applicable to both fracking and drilling operations.

Often, the reciprocating pump 100 may be quite large and may, for example, be supported by a semi-tractor truck ("semi") that can move the reciprocating pump 100 to and from a well. Specifically, in some instances, a semi may move the reciprocating pump 100 off a well when the reciprocating pump 100 requires maintenance. However, a reciprocating pump 100 is typically moved off a well only when a replacement pump (and an associated semi) is available to move into place at the well, which may be rare. Thus, often, the reciprocating pump is taken offline at a well and maintenance is performed while the reciprocating pump 100 remains on the well. If not for this maintenance, the reciprocating pump 100 could operate continuously to extract natural oil and gas (or conduct any other operation). Consequently, any improvements that extend the lifespan of components of the reciprocating pump 100, especially typical "wear" components, and extend the time between maintenance operations (i.e., between downtime) are highly desirable.

Figure 2:
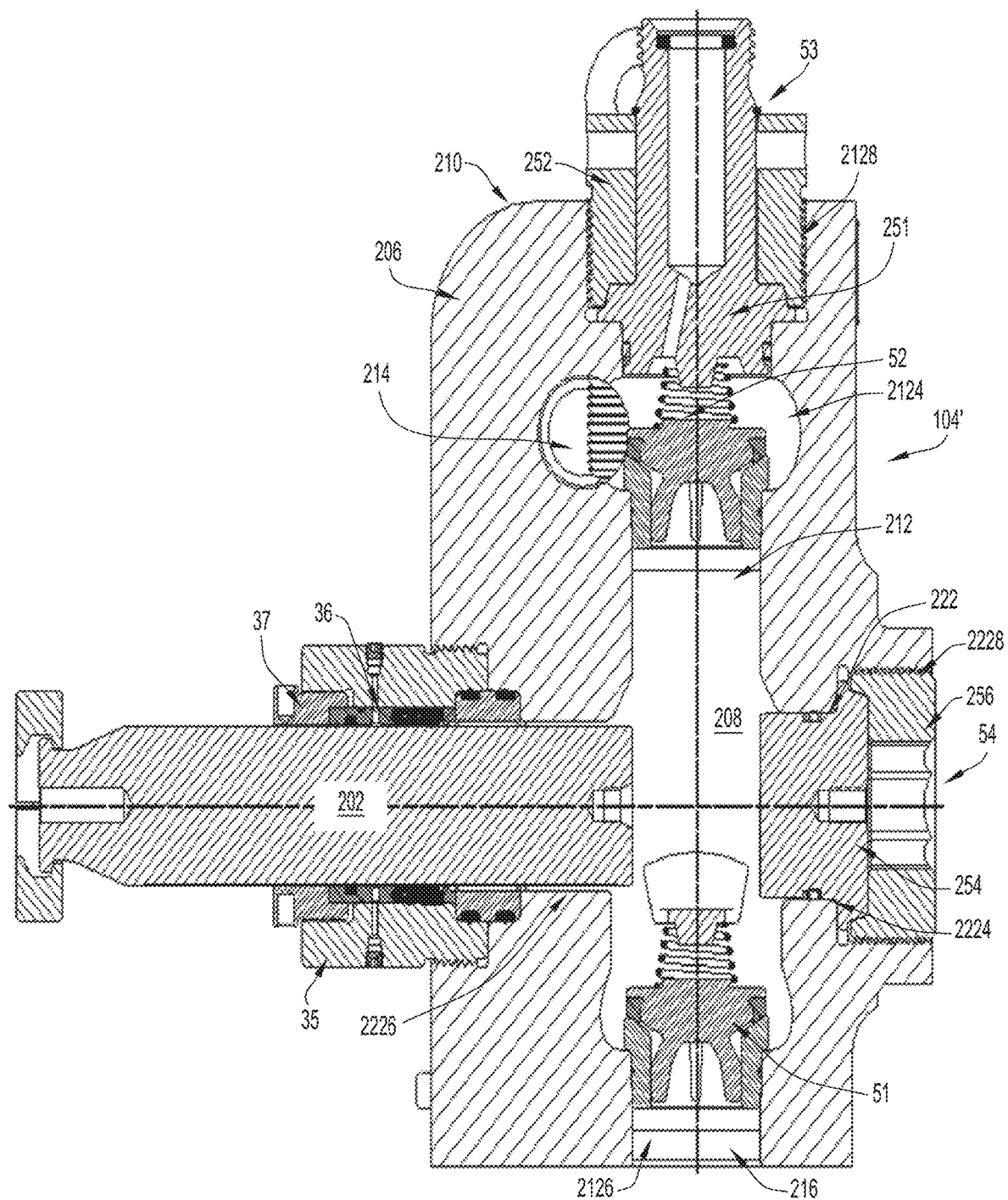
FIG. 2 is a cross-sectional side view of another prior art fluid end.

Still referring to FIG. 1, but now in combination with FIG. 2, in various embodiments, the fluid end 104 may be shaped differently and/or have different features, but may still generally perform the same functions, define similar structures, and house similar components. To illustrate potential shape variations, FIG. 2 shows a side, cross-sectional view of a fluid end 104' with different internal and external shaping as compared to fluid end 104. However, since fluid end 104 and fluid end 104' have many operational similarities, FIGS. 1 and 2 are labeled with the same reference numerals and are both described with respect to these common reference labels.

The view illustrated in FIG. 2 is taken along a central or plunger axis of one of the plungers 202 included in a reciprocating pump 100. Thus, although FIG. 2 illustrates a single pumping chamber 208, it should be understood that a fluid end 104 can include multiple pumping chambers 208 arranged side-by-side. In fact, in at least some embodiments (e.g., the embodiment of FIG. 1), a casing 206 of the fluid end 104 forms a plurality of pumping chambers 208 and each chamber 208 includes a plunger 202 that reciprocates within the casing 206. However, side-by-side pumping chambers 208 need not be defined by a single casing 206. For example, in some embodiments, the fluid end 104 may be modular and different casing segments may house one or more pumping chambers 208. In any case, the one or more pumping chambers 208 are arranged side-by-side so that corresponding conduits are positioned adjacent each other and generate substantially parallel pumping action. Specifically, with each stroke of the plunger 202, low pressure fluid is drawn into the pumping chamber 208 and high pressure fluid is discharged. But, often, the fluid within the pumping chamber 208 contains abrasive material (i.e., "debris") that can damage seals formed in the reciprocating pump 100.

As can be seen in FIG. 2, the pumping paths and pumping chamber 208 of the fluid end 104' are formed by conduits that extend through the casing 206 to define openings at an external surface 210 of the casing 206. More specifically, a first conduit 212 extends longitudinally (e.g., vertically) through the casing 206 while a second conduit 222 extends laterally (e.g., horizontally) through the casing 206. Thus, conduit 212 intersects conduit 222 to at least partially (and collectively) define the pumping chamber 208. In the prior art fluid end 104 and prior art fluid end 104', conduits 212 and 222 are substantially cylindrical, but the diameters of conduit 212 and conduit 222 may vary throughout the casing 206 so that conduits 212 and 222 can receive various structures, such as sealing assemblies or components thereof.

Regardless of the diameters of conduit 212 and conduit 222, each conduit may include two segments, each of which extend from the pumping chamber 208 to the external surface 210 of the casing 206. Specifically, conduit 212 includes a first segment 2124 and a second segment 2126 that opposes the first segment 2124. Likewise, conduit 222 includes a third segment 2224 and a fourth segment 2226 that opposes the third segment 2224. In the illustrated embodiment, the segments of a conduit (e.g., segments 2124 and 2126 or segments 2224 and 2226) are substantially coaxial while the segments of different conduits are substantially orthogonal. However, in other embodiments, segments 2124, 2126, 2224, and 2226 may be arranged along any desired angle or angles, for example, to intersect pumping chamber 208 at one or more non-straight angles.

In the illustrated embodiment, conduit 212 defines a fluid path through the fluid end 104. Segment 2126 is an intake segment that connects the pumping chamber to a piping system 106 delivering fluid to the fluid end 104. Meanwhile, segment 2124 is an outlet or discharge segment that allows compressed fluid to exit the fluid end 104'. Thus, in operation, segments 2126 and 2124 may include valve components 51 and 52, respectively, (e.g., one-way valves) that allow segments 2126 and 2124 to selectively open. Typically, valve components 51 in the inlet segment 2126 may be secured therein by a piping system 106 (as illustrated in FIG. 1). Meanwhile valve components 52 in outlet segment 2124 may be secured therein by a closure assembly 53 that, in the prior art example shown in FIG. 2, includes a closure element 251 (also referred to as a discharge plug) that is secured in the segment 2124 by a retaining assembly 252. Specifically, the prior art retaining assembly 252 is coupled to segment 2124 via threads 2128 defined by an interior wall of segment 2124.

On the other hand, segment 2226 defines, at least in part, a cylinder for plunger 202, and/or connects the casing 206 to a cylinder for plunger 202. For example, in the illustrated embodiment, a casing segment 35 is secured to segment 2226 and houses a packing assembly 36 configured to seal against a plunger 202 disposed interiorly of the packing assembly 36. In any case, reciprocation of a plunger 202 in or adjacent to segment 2226, which may be referred to as a reciprocation segment, draws fluid into the pumping chamber 208 via inlet segment 2126 and pumps the fluid out of the pumping chamber 208 via outlet segment 2124. Notably, in the illustrated prior art arrangement, the packing assembly 36 is retained within casing segment 35 with a retaining element 37 that is threadably coupled to casing segment 35.

Segment 2224 is an access segment that can be opened to access to parts disposed within casing 206 and/or surfaces defined within casing 206. During operation, access segment 2224 may be closed by a closure assembly 54 that, in the prior art example illustrated in FIG. 2, includes a closure element 254 (also referred to as a suction plug) that is secured in the segment 2224 by a retaining assembly 256. Notably, the prior art retaining assembly 256 is coupled to segment 2224 via threads 2228 defined by an interior wall of segment 2224. However, in some embodiments, conduit 222 need not include segment 2224 and conduit 222 may be formed from a single segment (segment 2226) that extends from the pumping chamber 208 to the external surface 210 of casing 206.

Overall, in operation, fluid may enter fluid end 104 (or fluid end 104') via multiple openings, as represented by opening 216 in FIG. 2, and exit fluid end 104 (or fluid end 104') via multiple openings, as represented by opening 214 in FIG. 2. In at least some embodiments, fluid enters openings 216 via pipes of piping system 106, flows through pumping chamber 208 (due to reciprocation of a plunger 202), and then flows through openings 214 into a channel 108 (see FIG. 1). However, piping system 106 and channel 108 are merely example conduits and, in various embodiments, fluid end 104 may receive and discharge fluid via any number of pipes and/or conduits, along pathways of any desirable size or shape.

Also, during operation of pump 100, the first segment 2124 (of conduit 212), the third segment 2224 (of conduit 222), and the fourth segment 2226 (of conduit 222) may each be "closed" segments. By comparison, the second segment 2126 (of conduit 212) may be an "open" segment that allows fluid to flow from the external surface 210 to the pumping chamber 208. That is, for the purposes of this application, a "closed" segment may prevent, or at least substantially prevent, direct fluid flow between the pumping chamber 208 and the external surface 210 of the casing 206 while an "open" segment may allow fluid flow between the pumping chamber 208 and the external surface 210. To be clear, "direct fluid flow" requires flow along only the segment so that, for example, fluid flowing from pumping chamber 208 to the external surface 210 along segment 2124 and channel 108 does not flow directly to the external surface 210 via segment 2124.

Figure 3:
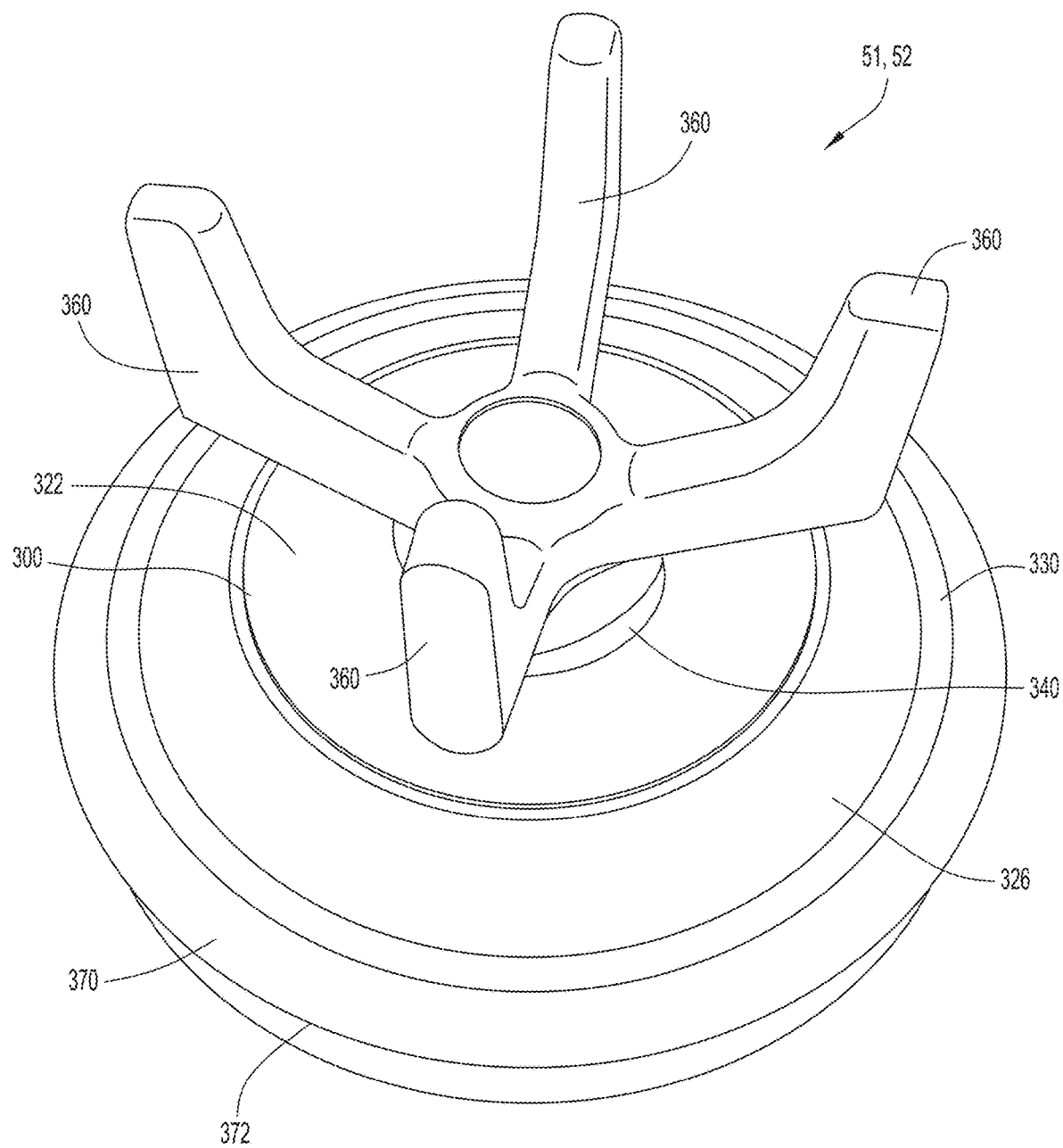
FIG. 3 illustrates a perspective view of a prior art valve component that may be utilized in the fluid ends illustrated in FIGS. 1 and 2.

Turning to FIG. 3, illustrated is a perspective view of one of the valve components 51, 52 illustrated in FIG. 2. The valve components 51, 52 may include a valve body 300, a leg assembly 340, and a sealing element or seal 370. The valve body 300 and the leg assembly 340 may be constructed from a metal, a metal alloy, or other similar material. The seal 370 may be a homogeneous elastomeric sealing element constructed from a material suitable for forming a seal, such as, but not limited to rubbers, thermoplastic materials (e.g., thermoplastic polyurethane (TPU), etc.), etc.

Figure 4:
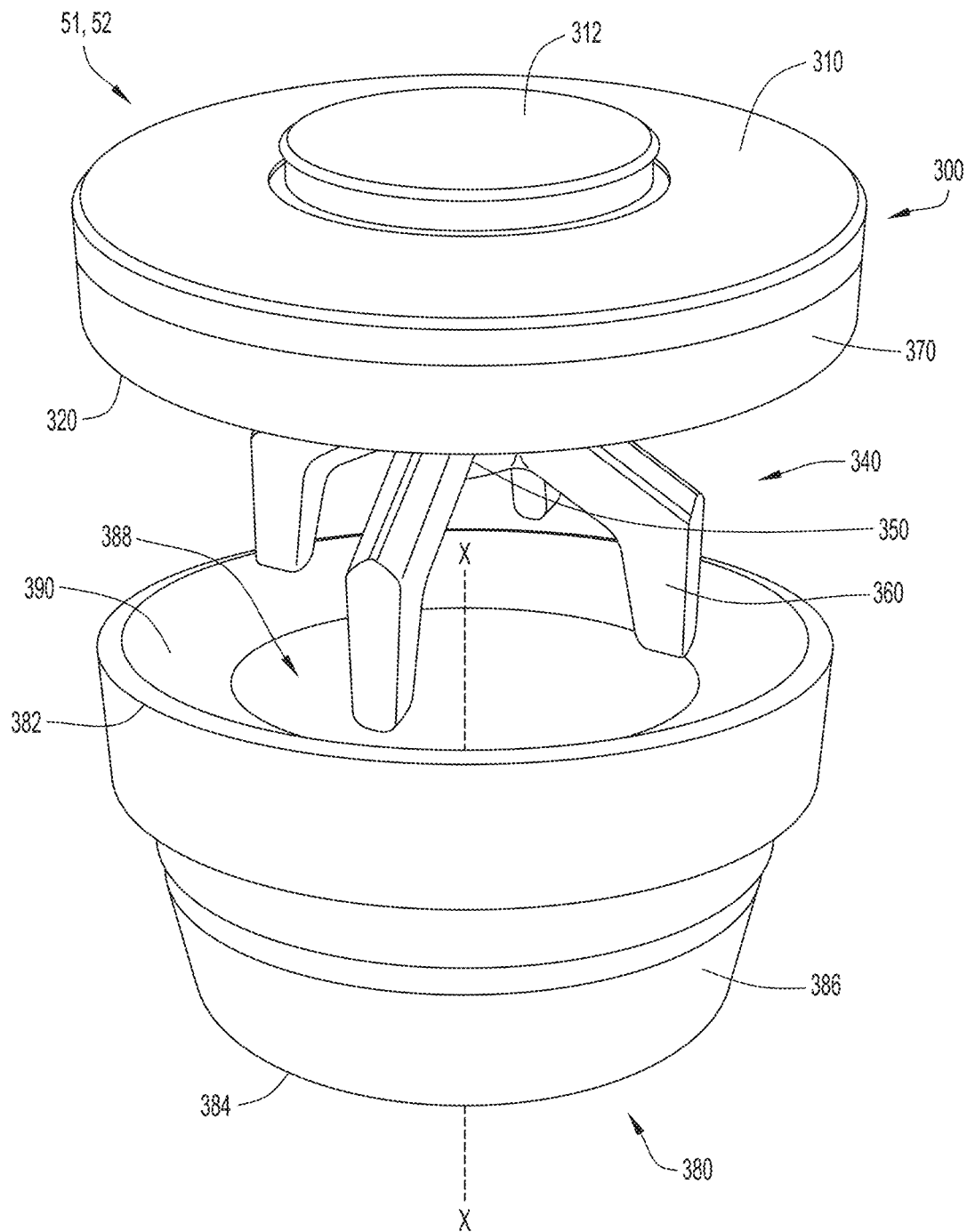
FIG. 4 illustrates a perspective view of the prior art valve component illustrated in FIG. 3 being inserted into a corresponding prior art valve seat to form a sealing arrangement.

As illustrated in FIGS. 3 and 4, the valve body 300 may have a substantially circular shape and may include a first side 310 and an opposite second side 320. The first side 310 (see FIG. 4), may be substantially planar with a central cylindrical protrusion 312. The second side 320 of the valve body 300 may include a central portion 322 and a sealing portion 330. A strike surface 326 that is angled with respect to the surface of the central portion 322 of the second side 320, and with respect to the first side 310, is disposed around the perimeter of the central portion 322. As shown in FIG. 3, the sealing portion 330 may be configured to receive a sealing element or seal 370.

Referring to FIG. 3, the leg assembly 340 of the valve component 51, 52 may include a main body or base portion 350 and a set of legs 360. The set of legs 360 may be in the form of extension members that are generally L-shaped. Each leg 360 may have a first end coupled to the main body of the leg assembly 340 and an opposite distal second end. As illustrated, the legs 360 may be equally spaced from one another around the main body 350 of the leg assembly 340.

In different embodiments, the leg assembly 340 may be coupled to the valve body 300 or may be formed uniformly with the valve body 300. As shown in FIG. 4, the legs 360 of the leg assembly 340 are configured to extend into a central opening or conduit 388 of a valve seat 380 to guide the valve component 51, 52 into a sealing position with the valve seat 380.

Referring back to FIG. 3, the seal 370 may be coupled to the valve body 300 at the scaling portion 330, and may be a homogeneous elastomeric sealing element. The seal 370 may include a sealing surface 372 and an opposite attachment surface (not shown). The attachment surface may be coupled to the sealing portion 330 of the valve body 300 in a manner where the seal 370 may be molded onto, adhered to, or bonded to the sealing portion 330 of the valve body 300. When coupled to the valve body 300, the sealing surface 372 of the seal 370 may serve as an extension of the strike surface 326 of the valve body 300. In other words, the seal 370 may, in conjunction with the strike surface 326 of the valve body 300, form a sealing surface of the valve component 51, 52.

Turning to FIG. 4, illustrated is a perspective view of the prior art valve component 51, 52 being inserted into a prior art valve seat 380, which is representative of that illustrated within the chamber 208 of the casing 206 in FIG. 2. The valve seat 380 may be substantially cylindrical with a first end 382, an opposite second end 384, and an outer surface 386 spanning between the first end 382 and the second end 384. The valve seat 380 may further include a central conduit 388 extending through the valve seat 380 from the first end 382 to the second end 384. The first end 382 of the valve seat 380 may further include a corresponding sealing surface or strike surface 390 that extends into the conduit 388, and is oriented at an angle with respect to a central axis of the conduit 388 such that the sealing surface 390 converges into the conduit toward the central axis X. In other words, items, components, structures, fluids, etc. that contact the sealing surface 390 may be funneled into the conduit 388.

As illustrated in FIG. 4, as the valve component 51, 52 is moved toward the scaling surface 390 of the valve seat 380, outer surfaces of the legs 360 of the valve component 51, 52 may contact the inner surface of the conduit 388 of the valve seat 380 to position the valve component 51, 52 with respect to the valve seat 380. Consequently, the sealing surface 372 of the seal 370 and the strike surface 326 of the valve body 300 are properly aligned with the corresponding sealing surface 390 of the valve seat 380. If the valve component 51, 52 is misaligned with the valve seat 380, the legs 360 of the valve component 51, 52 may contact the sealing surface 390, which then guides the legs 360 into the conduit 388 (and aligns the valve component 51, 52 with the valve seat 380) as the valve component 51, 52 is translated toward the valve seat 380. When the legs 360 of the valve component 51, 52 are fully inserted into the conduit 388, the sealing surface 372 of the seal 370 and the strike surface 326 of the valve body 300 contact, and are in abutment with, the corresponding sealing surface 390 of the valve seat 380.

As the valve component 51, 52 is repeatedly translated away from and toward the corresponding sealing surface 390 of the valve seat 380 during operation of the pump 100, the strike surface 326 of the valve body 300 may become worn. This may be due, at least in part, to the high pressures exerted on the valve component 51, 52, particles in the operating fluid passing through the conduit 388 and over the strike surface 326, and the repeated impact of the strike surface 326 on the sealing surface 390 of the valve seat 380. Once the strike surface 326 of the valve body 300 wears to a certain degree, the valve component 51, 52 no longer functions properly (i.e., does not properly seal against the valve seat, expedites the wear of the seal 370, etc.), and the valve component 51, 52 must be replaced. This results in added maintenance costs and reduces the utilization of the pump 100 because the pump 100 must be shut down in order to install new valve components 51, 52.

Figure 5:
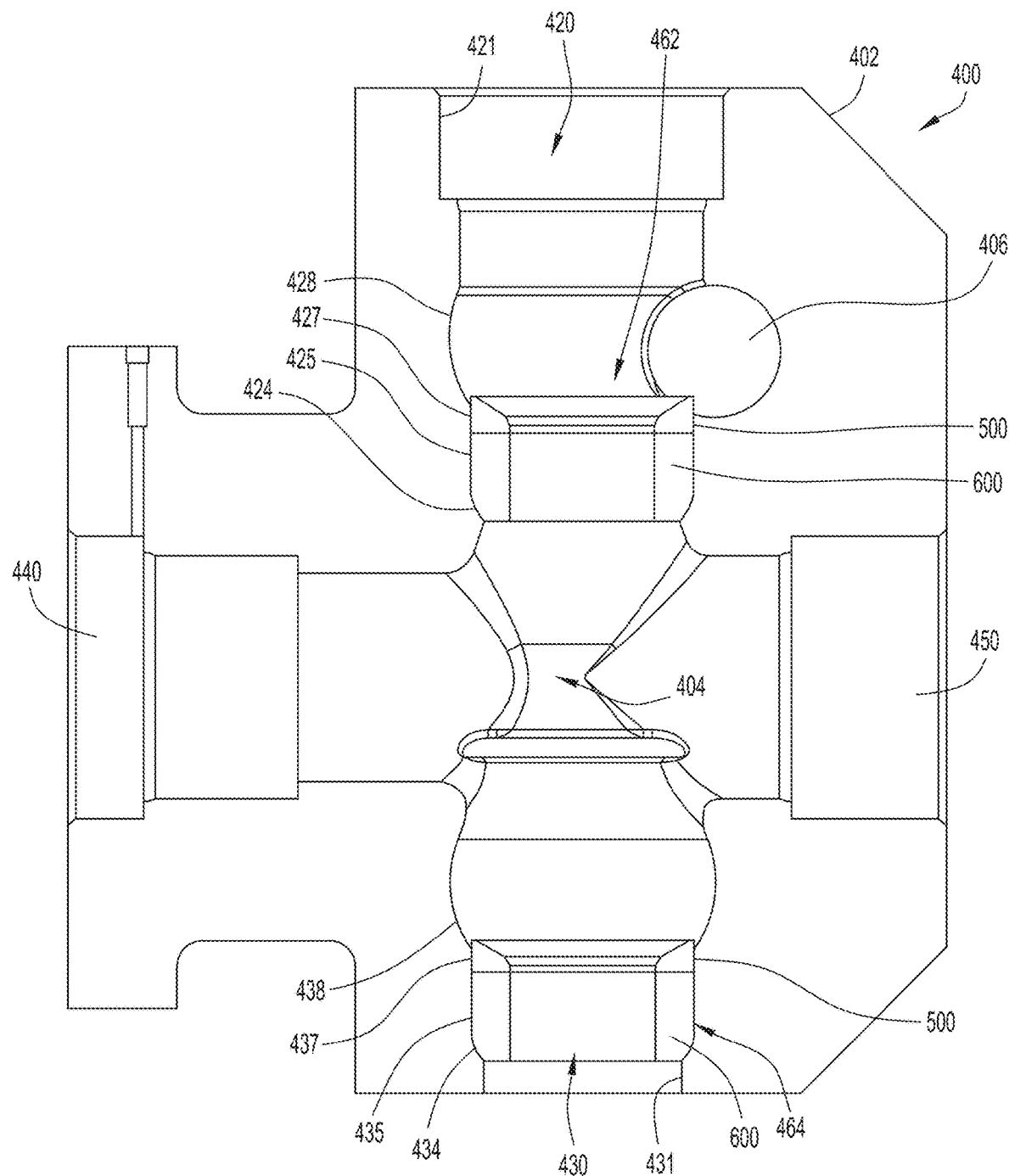
FIG. 5 illustrates a cross-sectional side view of a fluid end including valve seat assemblies according to the present invention.

Turning to FIG. 5, a cross-sectional side view of a fluid end casing according to the present invention is illustrated. In this embodiment, the fluid end casing 400 includes an external surface 402 and several bores in communication with a central bore 404. As shown, segments or bores 440 and 450 are generally opposite to and aligned with each other, and segments or bores 420 and 430 are generally opposite to and aligned with each other. Each of the bores 420, 430, 440, and 450 is in fluidic communication with the central bore 404. Bore 420 is also in fluidic communication with an opening 406 through which a fluid can flow out of the casing 400.

In the illustrated embodiment, bore 420 has an inner wall 421 that has different sized and shaped sections. In particular, the inner wall 421 includes a curved wall or bulbous section 428, a linear wall section 425 that engages section 428 at end or edge 427, and an angled wall section 424. Similarly, bore 430 has an inner wall 431 that has different sized and shaped sections. In particular, the inner wall 431 includes a curved wall or bulbous section 438, a linear wall section 435 that engages section 438 at end or edge 437, and an angled wall section 434.

Also shown in FIG. 5 are two different valve seat assemblies 462 and 464. Each valve seat assembly 462 and 464, which may also be referred to as a valve seat or variations thereof, includes a strike ring 500 (also referred to as strike portion, first portion, strike member, first member, and the like) and a support sleeve or member 600 (also referred to as support portion, second portion, and the like). In one embodiment, the support sleeve 600 can be referred to alternatively as a tapered sleeve or sleeve member. Bore 420 includes a portion into which valve seat assembly 462 is inserted and press fit into place. In particular, support sleeve 600 is inserted into bore 420 and moved therealong until it engages wall sections 424 and 425. The support sleeve 600 is then pressed into place in the position illustrated in FIG. 5. The strike ring 500 is then inserted into bore 420 and moved into engagement with the support sleeve 600. The strike ring 500 is press fit into the position illustrated in FIG. 5 so that its end surface proximate the support sleeve 600 engages the corresponding and proximate end surface of the support sleeve 600. Similarly, a support sleeve 600 and a strike ring 500 are inserted into bore 430 and press fit into the positions illustrated in FIG. 5.

Figure 6:
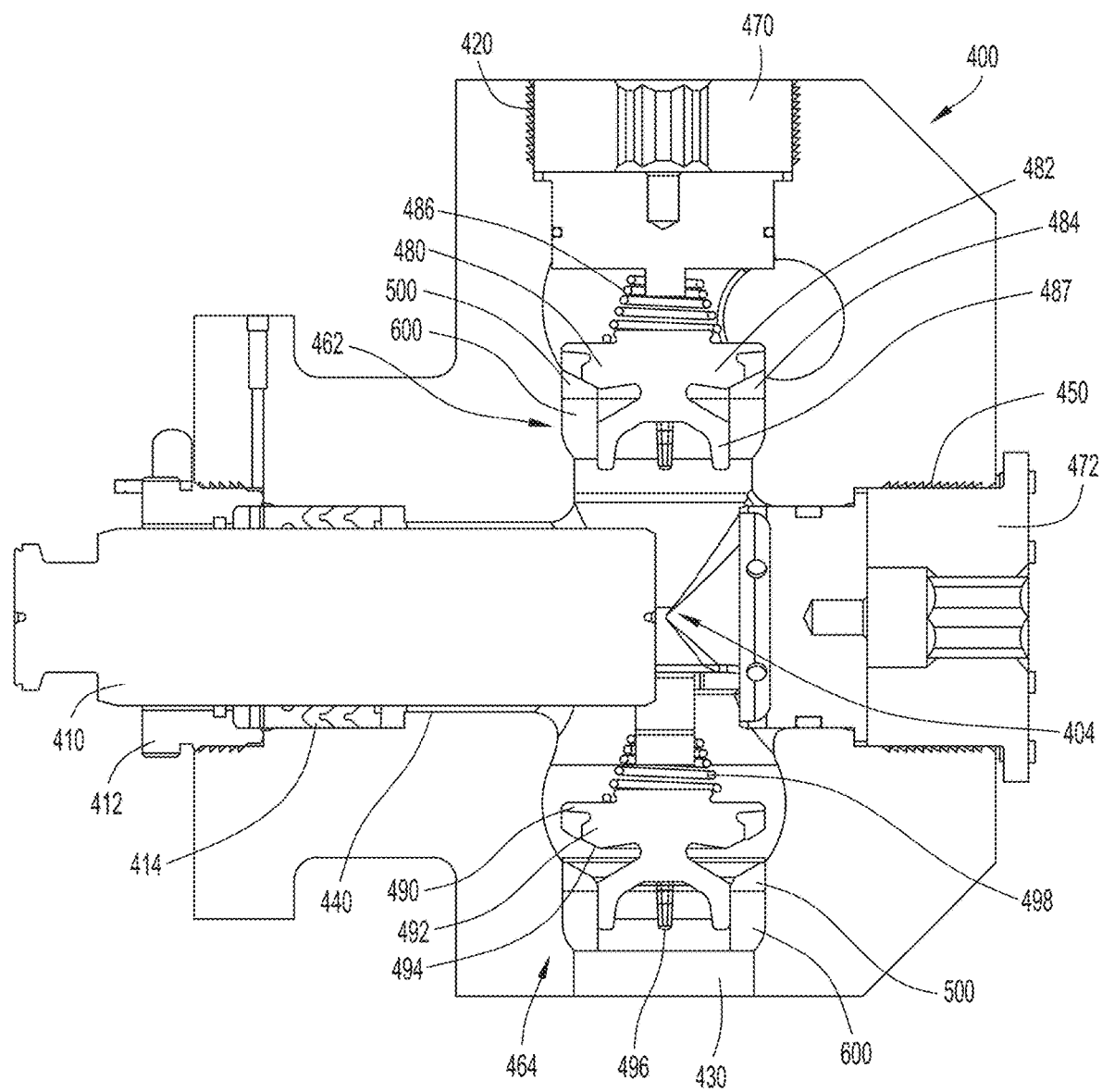
FIG. 6 illustrates a cross-sectional view of a fluid end including valve seat assemblies and valve components according to the present invention.

Referring to FIG. 6, a cross-sectional side view of the fluid end casing 400 shown in FIG. 5 is illustrated with additional components. In this embodiment, closure elements 470 and 472 are mounted in bores 420 and 450, respectively, and retained therein via threads on the inner walls defining the bores 420 and 450, respectively. The fluid end casing 400 includes a reciprocating member 410, such as a piston or plunger, is mounted in bore 440 for movement relative to the casing 400. A retaining element 412 is threadedly coupled to the fluid end casing 400 and retains the packing assembly 414 in place relative to the casing 400.

For bore 420, a valve or valve component 480 is shown relative to the valve seat assembly of strike ring 500 and support sleeve 600. The valve 480 is engaged by a biasing member 486, such as a spring, that applies a force to the valve into a closed position in which it engages the valve seat assembly 462. In FIG. 6, the valve 480 is illustrated in its closed position, in which the valve 480 prevents any fluid from flowing through valve assembly 462 and into the central bore 404. Similarly, for bore 430, another valve or valve component 490 is shown relative to the valve seat assembly 464, which includes a strike ring 500 and a support sleeve 600. A biasing member 498, such as a spring, engages the valve 490 and applies a force to bias the valve 490 into its closed position. Referring to FIG. 6, the valve 490 is illustrated in its open position in which the valve 490 is spaced apart from and does not engage the valve seat assembly 464. Additionally, biasing member 498 is compressed because fluid is flowing through valve seat assembly 464 and into the central bore 404.

In the illustrated embodiment, valve 480 includes a body 482 that has a sealing or strike surface 484 that engages a strike surface on the strike ring 500, as described in greater detail below. Coupled to the body 482 is a leg assembly 487 that includes several legs as shown. Similarly, valve 490 includes a body 492 that has a sealing or strike surface 494 that engages a strike surface on the strike ring 500. Valve 490 also includes a leg assembly 496 coupled to body 492, with the leg assembly 496 having several legs.

Figure 7:
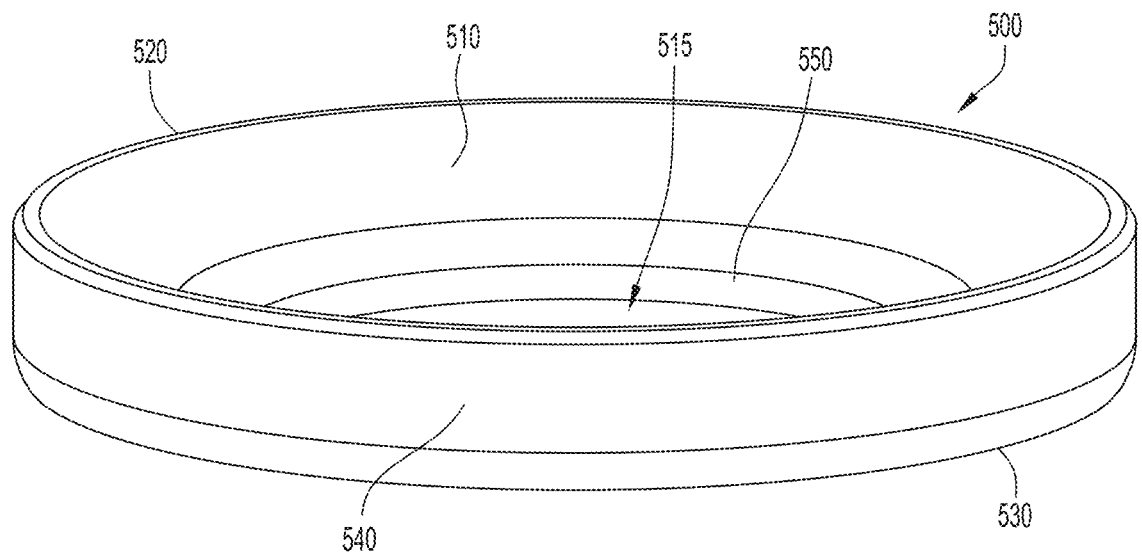
FIG. 7 illustrates a perspective view of an embodiment of a strike ring of a valve seat assembly according to the present invention.
Figure 8:
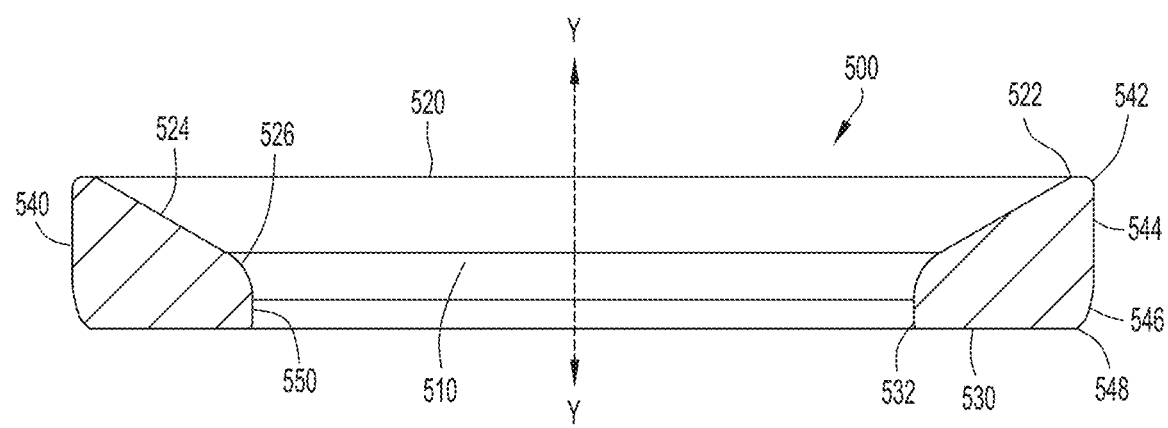
FIG. 8 illustrates a cross-sectional side view of the strike ring illustrated in FIG. 7.

Referring to FIGS. 7 and 8, an embodiment of a strike ring according to the present invention is illustrated. In this embodiment, the strike ring 500 has a circular ring-shaped configuration. As shown in FIG. 7, the strike ring 500 includes a body 510 that has an upper or first end or surface 520, a lower or second end or surface 530, an outer end or surface 540, and an inner end or surface 550. The inner surface 550 forms an inner wall that defines a bore 515 that extends through the body 510.

As shown in FIG. 8, the upper end or surface 520 is generally narrow and includes an inner edge that defines an inner diameter 522. The upper surface 520 also includes a tapered or angled surface 524 that forms a strike surface that is engaged by a corresponding strike surface on a valve component. In one embodiment, the tapered surface 524 is oriented at approximately 30 degrees relative to an axis Y extending through the center of bore 515. In addition, that same orientation is also relative to the inner surface 550 that defines bore 515. The width of the tapered surface 524 is designed so that it can be engaged by both the strike surface and the sealing element of a valve component, which is described in greater detail below. The inner end of the tapered surface 524 transitions into a curved surface 526 which is connected to inner surface 550. The lower surface 530 has an inner edge 532 defining an inner diameter. As shown in FIG. 8, the inner diameter defined by inner edge 532 is smaller than the inner diameter defined by inner edge 522 due to the orientation and configuration of tapered surface 524.

The outer end or surface 540 has several different parts or wall sections. Proximate to upper surface 520 is an upper angled surface 542 that is adjacent to a planar or straight wall section 544. Wall section 544 defines the outer diameter of the strike ring 500. In this embodiment, the outer diameter defined by wall section 544 is selected to match the inner diameter of the corresponding portion of the fluid end casing bore into which the strike ring 500 is to be inserted. If the wall section 544 outer diameter has an interference fit with the inner diameter of the fluid end bore, then the strike ring 500 can be press fit securely into the fluid end bore and retained therein by friction.

The outer surface 540 also has a first lower angled wall section or portion 546 and a second lower angled wall section or portion 548, which is oriented at a different angle with respect to an axis Y through bore 515 than wall section 546. The angled wall portions 542, 546, and 548 facilitate the insertion and removal of the strike ring 500 from the fluid end casing bore.

The strike ring 500 may be formulated or constructed from a carbide material (e.g., tungsten carbide (WC)). While the structure of a carbide material may be weak in tension, it may have a relatively high strength under compression, which is important for the construction presented in the present application. For example, the compressive strength of these materials may be higher than virtually all melted and cast or forged metals and alloys. In addition, these materials may be two to three times more rigid than steel and four to six times more rigid than cast iron and brass.

Figure 9:
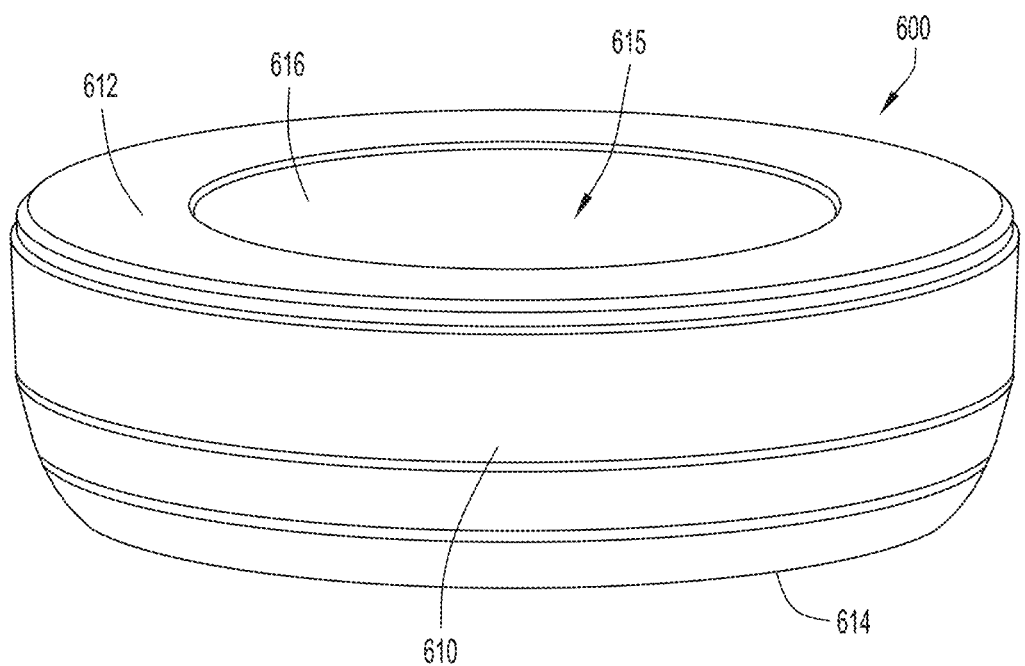
FIG. 9 illustrates a perspective view of an embodiment of a support sleeve according to the present invention.
Figure 10:
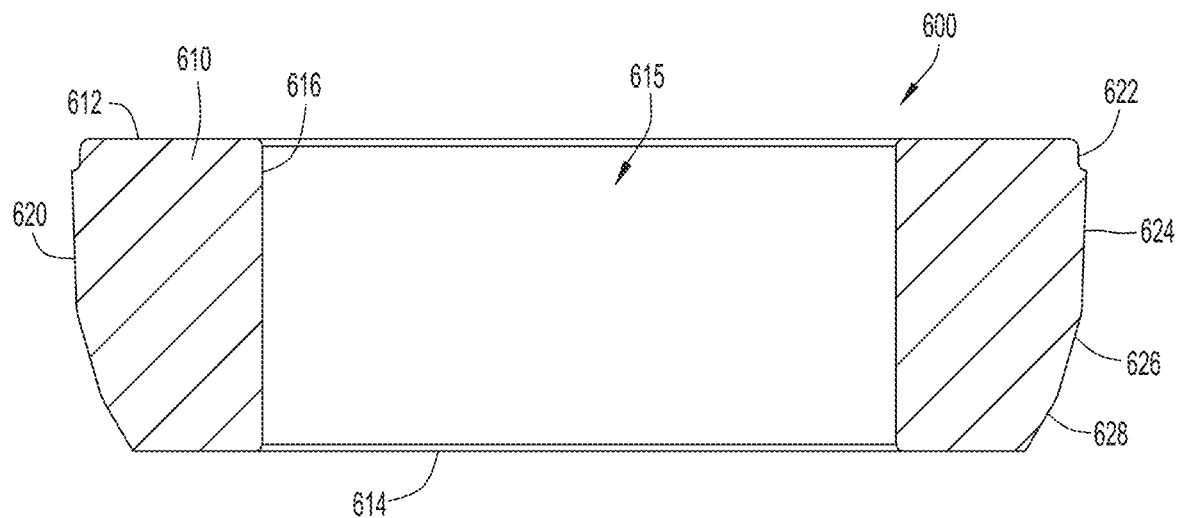
FIG. 10 illustrates a cross-sectional side view of the support sleeve illustrated in FIG. 9.
Figure 11:
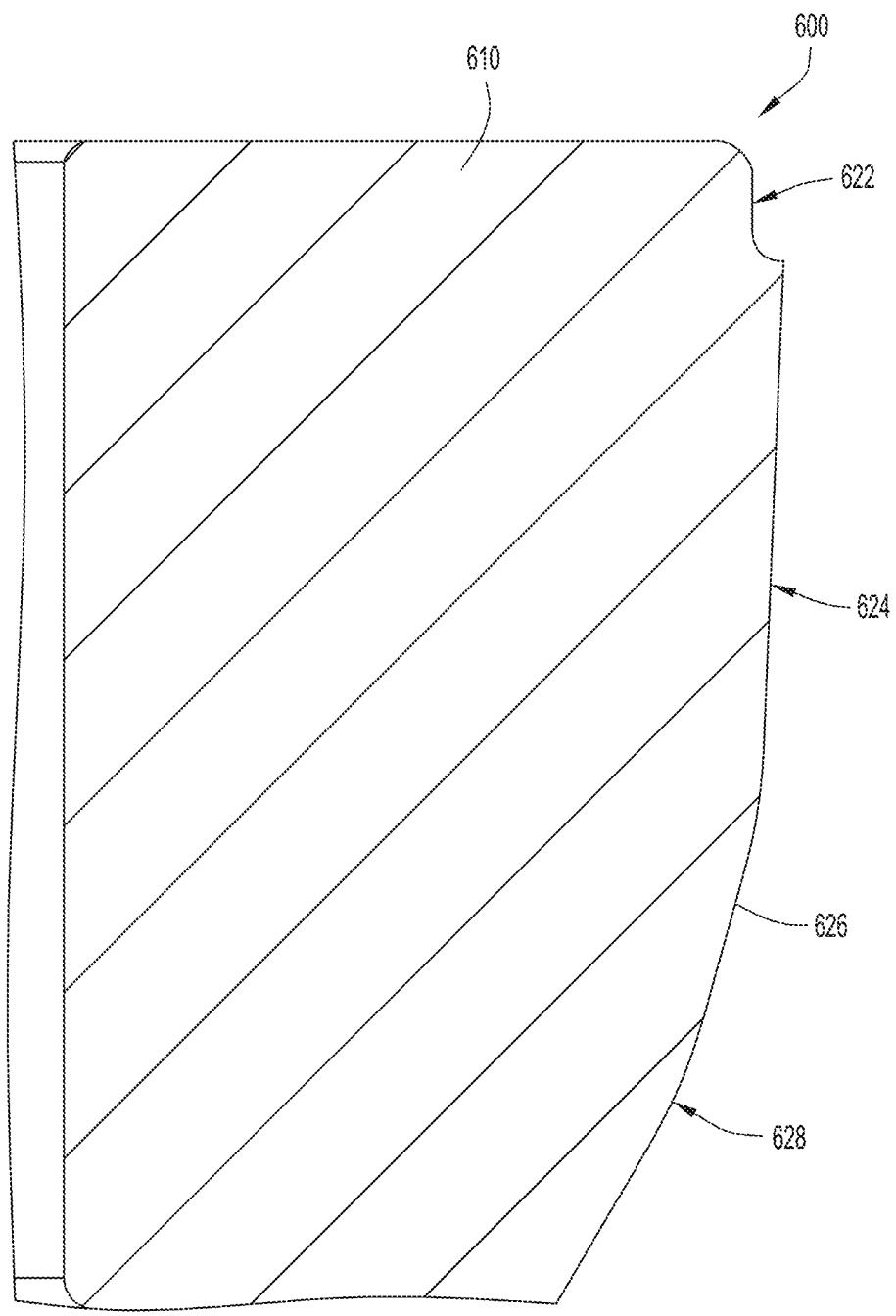
FIG. 11 illustrates a close-up cross-sectional side view of a portion of the support sleeve illustrated in FIG. 10.

Referring to FIGS. 9 and 10, an embodiment of a support sleeve according to the present invention is illustrated. In this embodiment, the support sleeve 600 has a circular ring-shaped configuration. The support sleeve 600 includes a body 610 that has an upper or first end or surface 612 and an opposite a lower or second end or surface 614. The body also has an inner surface 616 that forms an inner wall that defines a bore 615 extending through the body 610. Opposite the inner surface 616 is an outer end or surface 620 that has several different parts or wall sections. In this embodiment, the outer surface 620 has a relief feature 622, an angled or tapered surface 624, an angled or tapered surface 626, and another angled or tapered surface 628. Each of the tapered surfaces 624, 626, and 628 is oriented at a different angle relative to an axis Y extending through the bore 615. The tapering of surfaces 624, 626, and 628 and the angles thereof are configured to match the tapering of corresponding inner wall surfaces of the fluid end casing bore into which the support sleeve 600 is inserted. By matching the surfaces on the outside of the support sleeve 600 with those of the fluid end casing bore, a tight and secure fit can be achieved between the support sleeve 600 and the fluid end casing when the support sleeve 600 is inserted into the bore. Turning to FIG. 11, a close-up perspective view of the support sleeve 600 is illustrated. As shown, the tapered surfaces 624, 626, and 628 are angled or oriented at different angles. Tapered surface 624 defines the outermost diameter of the support sleeve 600.

Figure 12:
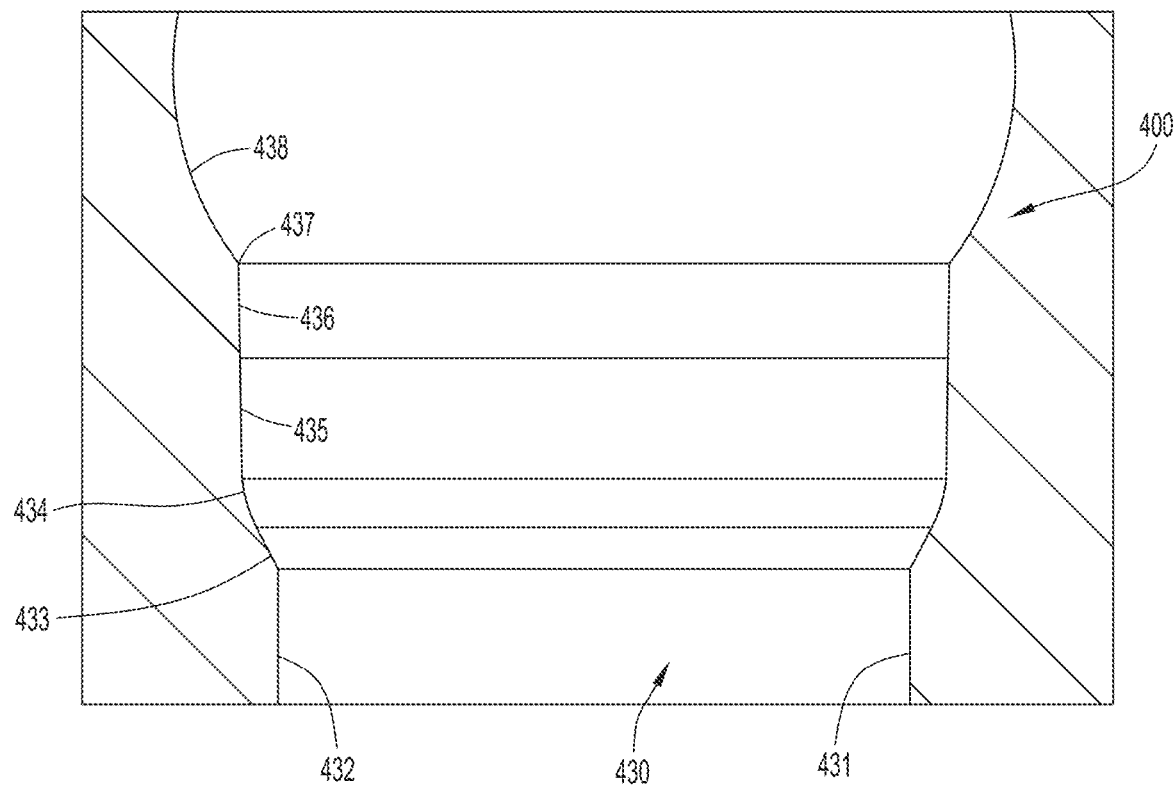
FIG. 12 illustrates a cross-sectional side view of a portion of a fluid end according to the invention.

Referring to FIG. 12, a cross-sectional side view of a portion of a fluid end casing according to the present invention is illustrated. As shown, the fluid end casing 400 includes bore 430, which is defined by an inner surface 431, as described above. The different parts of the inner surface 431 collectively define the bore 430. A distal wall section 432 is generally linear and parallel to the longitudinal axis of the bore 430. The distal wall section 432 defines the entrance of the bore 430. Inward of the distal wall section 432 are two angled wall sections 433 and 434, which are oriented at different angles relative to each other. Next, two linear wall sections 435 and 436 are located next to each other. Linear wall section 436 has an end or edge 437 at which point the inner wall 431 changes to the curved wall section 438.

When the support sleeve 600 is inserted into the bore, wall sections 433, 434, and 435 engage the support sleeve 600. The inner diameters and shapes of wall sections 433, 434, and 435 are sized to match the outer diameters and shapes of the different portions of the support sleeve 600 that engage them. In one embodiment, the support sleeve 600 is press fitted and interlocks into the fluid end. Support sleeve wall section 624 has taper of ¾": 1 per foot length that mates with bore wall section 435. Support sleeve wall sections 626 and 628 are angled so as to bottom out.

When the strike ring 500 is subsequently inserted into the bore, wall section 436 engages the outer surface of the strike ring 500. The inner diameter of wall section 436 is sized to match the outer diameter of the strike ring 500 to enable a press fit mounting of the strike ring 500 to the fluid end casing in the bore. In one embodiment, the strike ring is press fitted or can be shrunk fitted and bottomed out on top of the support sleeve.

Figure 13:
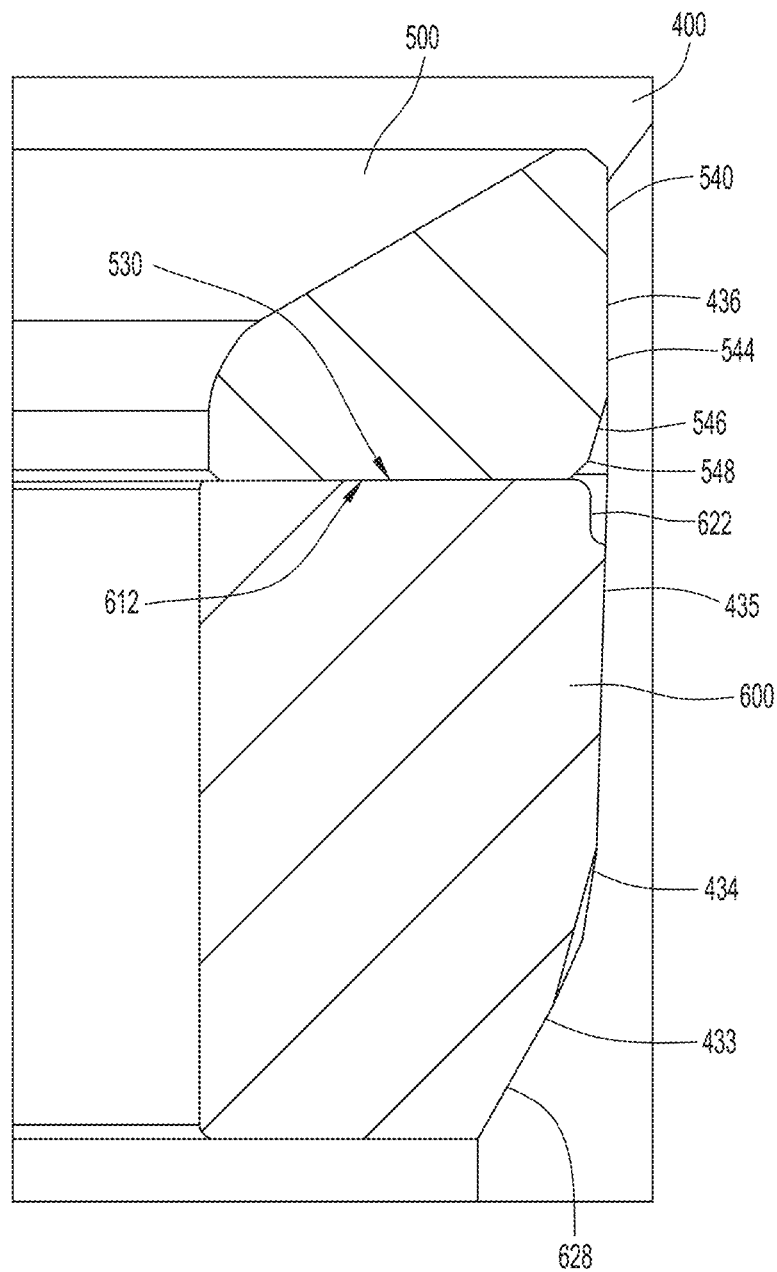
FIG. 13 illustrates a close-up cross-sectional side view of the strike ring and the support sleeve according to the present invention.

Referring to FIG. 13, a cross-sectional view of the strike ring 500 and the support sleeve 600 inserted into a bore of the fluid end casing 400 is illustrated. The support sleeve 600 is inserted into the bore so that its lower wall portion 628 engages the angled wall section 433 of the bore 430. As shown, the different outer wall sections of support sleeve 600 engage the corresponding wall sections 433, 434, and 435 of the bore 430. The relief feature 622 is proximate to the upper surface 612 of the support sleeve 600 and adjacent to the split between bore wall section 435 and bore wall section 436. The relief feature 622 can be used to assist with the removal and insertion of the support sleeve 600.

After the support sleeve 600 is inserted into place in the bore 430, the strike ring 500 is then inserted into place. The strike ring 500 is slid into the bore 430 until its lower surface 530 engages the upper surface 612 of the support sleeve 600. The outer surface 540 of the strike ring 500 (in particular, the planar or linear portion 544) engages the inner wall 436 of the bore 430. The angled surfaces 546 and 548 do not engage the wall of the bore 430 when the strike ring is inserted or removed, thereby facilitating the insertion and removal of the strike ring 500 from the bore 430.

Figure 14:
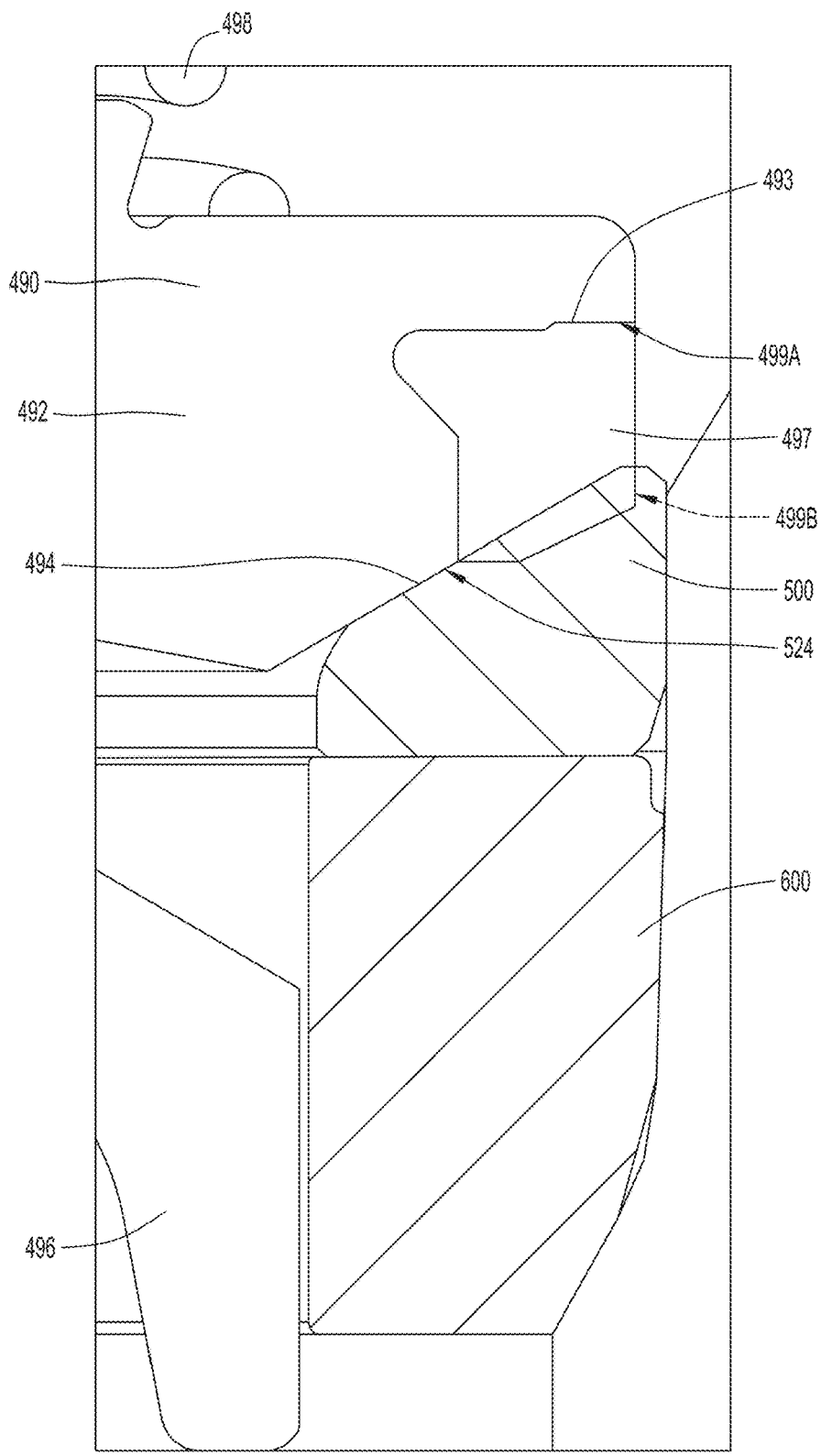
FIG. 14 illustrates a cross-sectional side view of the strike ring and the support sleeve illustrated in FIG. 13, with a valve component engaging the strike ring.

Referring to FIG. 14, the engagement of a valve component with the valve seat assembly is illustrated. As shown, the strike ring 500 and the support sleeve 600 are inserted into the bore 430 as discussed relative to FIG. 13. The valve 490 is illustrated in its closed position and is biased by biasing member 498. The leg portions 496 of the valve 490 extend through the bore 615 of the support sleeve 600.

The valve body 492 has a strike surface or sealing surface 494 and a surface 493 that defines a recess into which a resilient member or sealing member 497 is mounted. In one embodiment, the sealing member 497 may be any desired sealing element, such as a homogeneous elastomeric sealing element. In other words, the sealing member 497 may be constructed from a material suitable for forming a seal, such as, but not limited to rubbers, thermoplastic materials (e.g., thermoplastic polyurethane (TPU)), or similar materials. The sealing member 497 may include an attachment surface 499A and an outer sealing surface 499B, the unbiased profile of which is shown in dashed lines in FIG. 14.

When the valve 490 engages the strike ring 500, the sealing member 497 is compressed and its outer sealing surface 499B engages and matches the configuration of the strike surface or sealing surface 524 of the strike ring 500. The attachment surface 499A may be coupled to the valve body 492 in a manner where the sealing member 497 may be molded or compression molded onto, adhered to, or bonded to the valve body 492. When coupled to the valve body 492, the sealing member 497 may serve as an extension of the strike surface 494 and form, in conjunction with the strike surface 494, a sealing surface of the valve 490.

Figure 15:
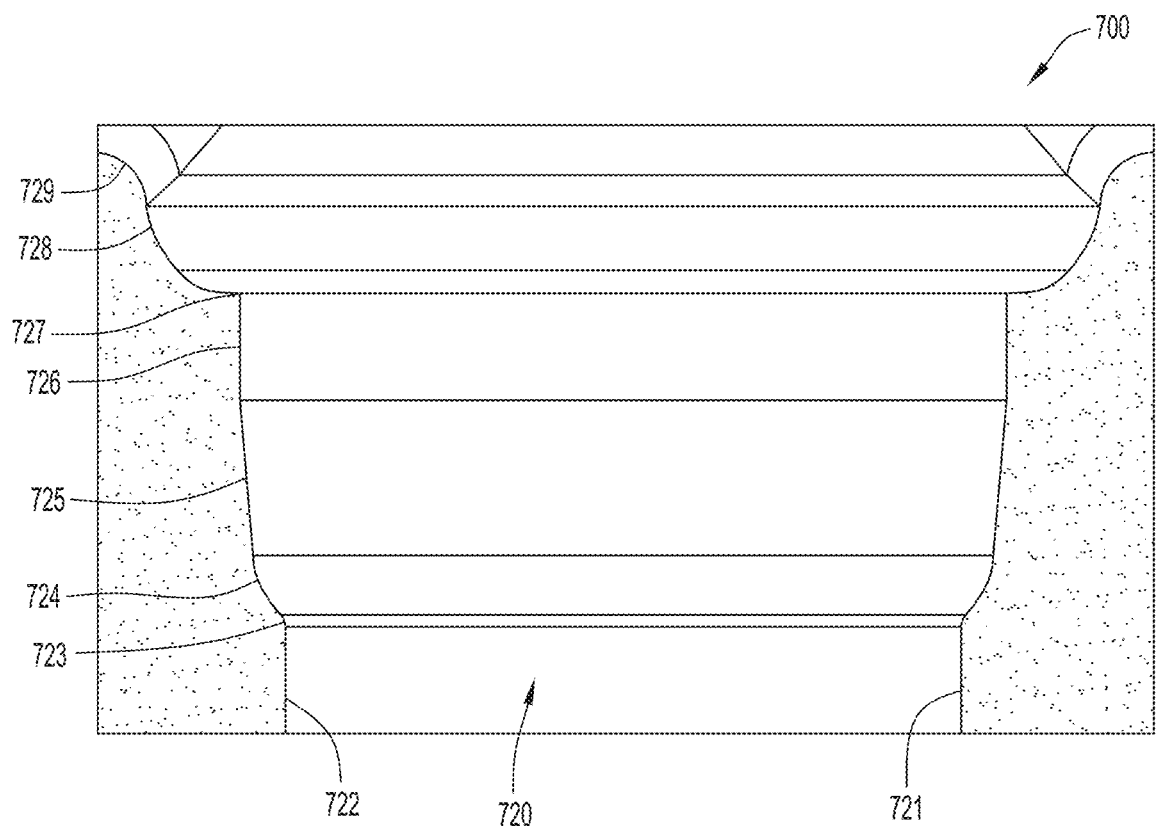
FIG. 15 illustrates a partial cross-sectional side view of an alternative embodiment of a fluid end showing one of the bores of the fluid end.
Figure 16:
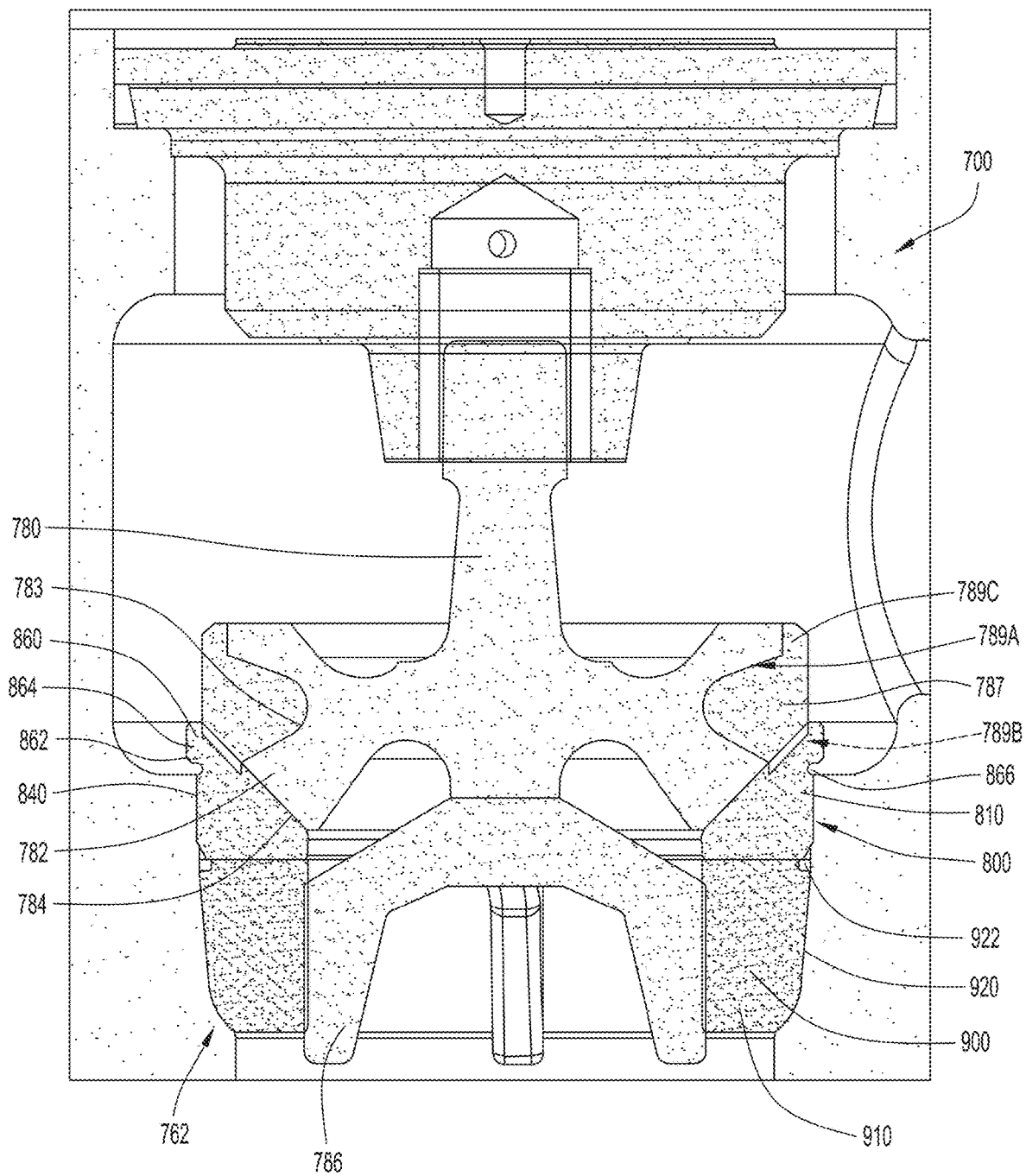
FIG. 16 illustrates a cross-sectional view of the fluid end illustrated in FIG. 15 including a valve seat assembly and valve components according to the present invention.

Referring to FIGS. 15 and 16, an alternative embodiment of the present invention is illustrated. FIG. 15 illustrates a partial cross-sectional side view of an alternative embodiment of a fluid end showing one of the bores of the fluid end. In this embodiment, the fluid end 700 includes a bore 720 has an inner wall 721 that has different sized and shaped sections that collectively define the bore 720. In particular, the inner wall 721 includes a distal wall section 722 that is generally linear and parallel to the longitudinal axis of the bore 720. The distal wall section 722 defines the entrance of the bore 720. Inward of the distal wall section 722 are an angled wall section 723 and a curved wall section 724, which are oriented at different angles relative to each other. Next, a tapered wall section 725 and a flat or linear wall section 726 are located next to each other. The flat or linear wall section 726 has an end or edge 727 at which point the inner wall 721 transitions to a concave-shaped curved wall section 728 and then a convex-shaped curved wall section 729.

Referring to FIG. 16, a cross-sectional view of the fluid end 700 is shown with a valve seat assembly 762 and valve components. As illustrated, a valve seat assembly 762, which may also be referred to as a valve seat or variations thereof, includes a strike ring 800 (also referred to as strike portion, first portion, strike member, first member, and the like) and a support sleeve or member 900 (also referred to as support portion, second portion, and the like). The support sleeve 900 can be referred to alternatively as a tapered sleeve or sleeve member.

Bore 720 includes a portion into which valve seat assembly 762 is inserted and press fit into place. In particular, support sleeve 900 is inserted into bore 720 and moved therealong until it engages wall sections 723, 724 and 725 and is then pressed into place. The strike ring 800 is then inserted into bore 720 and moved into engagement with the support sleeve 900. The strike ring 800 is press fit so that its end surface proximate the support sleeve 900 engages the corresponding and proximate end surface of the support sleeve 900.

For bore 720, a valve or valve component 780 is shown relative to the valve seat assembly of strike ring 800 and support sleeve 900. The valve 780 is engaged by a biasing member (not shown) that applies a force to bias the valve 780 into a closed position in which it engages the valve seat assembly 762. In this embodiment, valve 780 includes a body 782 that has a sealing or strike surface 784 that engages a strike surface on the strike ring 800. Coupled to the body 782 is a leg assembly 786 that includes several legs. The valve body 782 also includes a surface 783 that defines a recess into which a resilient member or sealing member 787 is mounted. In one embodiment, the sealing member 787 may be any desired sealing element, such as a homogeneous elastomeric sealing element. The sealing member 787 may be constructed from a material suitable for forming a seal, such as, but not limited to rubbers, thermoplastic materials (e.g., thermoplastic polyurethane (TPU)), or similar materials. The sealing member 787 may include an attachment surface 789A and an outer sealing surface 789B, the unbiased profile of which is shown in FIG. 16. The sealing member 787 also includes an extension portion 789C that extends along the outer surface of the valve body 782 and forms part of the outer surface of the valve 780.

The strike ring 800 has a circular ring-shaped configuration, and includes a body 810 with an outer surface 840. In this embodiment, the strike ring 800 includes an upper portion 860 with an outwardly extending portion 864 that has an outer surface 862. The outwardly extending portion 864 forms a groove or notch 866 extending around the outer perimeter of the body 810. As shown, the outer surface 862 extends radially outwardly more than the outer surface 840 of the body 810, and also has an outer diameter that is greater than the diameter of the bore 720 defined by inner wall section 726. As a result, the outwardly extending portion 864 provides a greater surface radially that can be engaged by the valve 780 to increase the reliability of the sealing. In this embodiment, the support sleeve 900 has a circular ring-shaped configuration and includes a body 910 that has an outer end or surface 920 with a relief feature 922.

While the apparatuses presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, the valve components, valve body, the valve seat assembly components, the valve seat, the support sleeve, and sealing elements described herein may be modified to be of any shape and of any material.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivations (such as "comprising," etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about," "around," "generally," and "substantially."

What is claimed is:

1. A valve seat assembly for a reciprocating pump, the valve seat assembly being insertable into a bore in a fluid end casing of the reciprocating pump, the valve seat assembly comprising:
   a strike ring having a first body, the first body having a
      first end surface, a second end surface opposite the first end surface, and a first outer surface, the first body having a first inner surface that defines a first bore extending through the first body, the second end surface being a most upstream portion of the first body with respect to a pumping chamber in the fluid end casing; and a support sleeve having a second body, the second body having a third end surface, a fourth end surface opposite the third end surface, and a second outer surface, the second outer surface having a different configuration than the first outer surface, and the third end surface of the second body being engaged by the second end surface of the first body, the second body defining a second inner surface that defines a second bore extending through the second body, the third end surface being a most downstream portion of the second body with respect to the pumping chamber in the fluid end casing, wherein the strike ring is engageable by a valve, the first body and the second body are separable from engagement with each other, the first bore is aligned with the second bore when the first body is proximate to the second body.

2. The valve seat assembly of claim 1, wherein the strike ring is constructed from a tungsten carbide material.

3. The valve seat assembly of claim 1, wherein the first end surface of the strike ring is angled with respect to the first outer surface and forms at least a portion of a strike surface of the strike ring.

4. The valve seat assembly of claim 1, wherein the first end surface is a strike surface that is oriented at an angle relative to the first inner surface.

5. The valve seat assembly of claim 4, wherein the angle is approximately 30 degrees.

6. The valve seat assembly of claim 4, wherein the second outer surface of the second body includes a first tapered portion and a second tapered portion, the second tapered portion being oriented at a different angle relative to the second bore than the first tapered portion.

7. The valve seat assembly of claim 6, wherein the first outer surface of the first body is straight and at least a portion of the second outer surface of the second body is tapered.

8. The valve seat assembly of claim 7, wherein the second outer surface includes a relief feature formed therein.

9. The valve seat assembly of claim 1, wherein the first body is insertable into a first portion of the bore in the fluid end casing of the reciprocating pump, and the support sleeve is insertable into a second portion of the bore in the fluid end casing.

10. The valve seat assembly of claim 1, wherein the support sleeve has a first outer surface and the strike ring has a second outer surface, and a portion of the first outer surface has an outer diameter that is the same as a portion of the second outer surface.

11. A valve assembly for a fluid end of a reciprocating pump, the valve assembly comprising:

a valve component including a valve body, the valve body having a first strike surface and defining a recess, the valve body including an insert disposed at least in part in the recess; and a valve seat assembly disposable in a bore of the fluid end, the valve seat assembly includes a strike ring and a support sleeve, the strike ring is engageable with the support sleeve when the strike ring and the support sleeve are placed in the bore, the strike ring has a first end surface, a second end surface opposite the first end surface, and a first inner surface that defines a first bore extending through the strike ring, the second end surface being a most upstream portion of the strike ring with respect to a pumping chamber in the fluid end, the support sleeve having a third end surface, a fourth end surface opposite the third end surface, and a second inner surface that defines a second bore extending through the support sleeve, the third end surface is being a most downstream portion of the support sleeve with respect to the pumping chamber in the fluid end, wherein the strike ring has a second strike surface, both of the first strike surface and the insert of the valve component engage the second strike surface of the strike ring when the valve component engages the strike ring, the first bore is aligned with the second bore when the strike ring is proximate to the support sleeve, no portion of the strike ring is inside any portion of the support sleeve, and the strike ring and the support sleeve are separable from engagement with each other.

12. The valve assembly of claim 11, wherein the strike ring is constructed from a tungsten carbide material.

13. The valve assembly of claim 11, wherein the second end surface of the strike ring engages the third end surface of the support sleeve when the strike ring engages the support sleeve.

14. The valve assembly of claim 13, wherein the first end surface of the strike ring is angled with respect to the first bore, and the first end surface forms the second strike surface.

15. The valve assembly of claim 11, wherein a second outer surface of the support sleeve includes a first tapered portion and a second tapered portion, the second tapered portion being oriented at a different angle relative to the second bore than the first tapered portion.

16. The valve assembly of claim 11, wherein the insert is made from a resilient material and its profile is compressed when the valve component engages the strike ring.

17. A fluid end casing, comprising:

a housing having an external surface, a central bore, and several bores in communication with the central bore, wherein a first bore of the several bores has an inner wall that has different sized and shaped sections, the different sized and shaped sections including:

a curved bulbous section;

a linear wall section that engages the bulbous section at a first end; and an angled wall section, wherein the first bore is configured to receive a valve seat assembly therein, the valve seat assembly including a strike ring and a support sleeve engageable by the strike ring, the support sleeve being engageable with the linear wall section and with the angled wall section when the support sleeve is inserted into the first bore, wherein the first bore is configured to receive the valve seat assembly such that the strike ring and the support sleeve are separable from engagement with each other when the strike ring and the support sleeve are inserted in the first bore.

18. The fluid end casing of claim 17, wherein the linear wall section is located between the bulbous section and the angled wall section.

19. The fluid end casing of claim 17, wherein the strike ring is engageable with the linear wall section when the strike ring is inserted into the first bore.

* * * * *